United States Patent [19]

McInnis et al.

[11] Patent Number: 5,506,283
[45] Date of Patent: Apr. 9, 1996

[54] HIGHER MODULUS COMPOSITIONS INCORPORATING PARTICULATE RUBBER

[75] Inventors: Edwin L. McInnis, Allentown; Bernard D. Bauman, Emmaus; Mark A. Williams, Souderton, all of Pa.

[73] Assignee: Composite Particles, Inc., Allentown, Pa.

[21] Appl. No.: 344,097

[22] Filed: Nov. 23, 1994

Related U.S. Application Data

[63] Continuation-in-part of Ser. No. 129,227, Sep. 29, 1993, which is a continuation of Ser. No. 842,815, Feb. 27, 1992 abandoned.

[51] Int. Cl.$^6$ .................................................. C08F 8/22
[52] U.S. Cl. ........................... 515/332.8; 525/332.9; 525/333.1; 525/333.2; 525/356; 525/42.5
[58] Field of Search ........................... 525/332.8, 332.9, 525/333.1, 333.2

[56] References Cited

U.S. PATENT DOCUMENTS

| | | | |
|---|---|---|---|
| 3,553,857 | 1/1971 | Pettet et al. | 36/32 |
| 4,501,859 | 2/1985 | Newman et al. | 525/356 |
| 4,710,538 | 12/1987 | Jorgensen | 525/53 |
| 4,771,110 | 9/1988 | Bauman et al. | 525/131 |
| 4,992,513 | 2/1991 | Bauer et al. | 525/184 |
| 4,996,262 | 2/1991 | Pyke et al. | 525/177 |

FOREIGN PATENT DOCUMENTS

| | | |
|---|---|---|
| 433313 | 8/1935 | United Kingdom . |
| 2025321 | 1/1980 | United Kingdom . |

OTHER PUBLICATIONS

J. Harper Tervet, et al., "Chlorinolysis Reclaims Rubber of Waste Tires", NASA Tech Brief, vol. 5, No. 3, Item 55 (Jan. 1981).

K. Kinoshita, "Treatment of Rubber Vulcanizate with Chlorine Gas or Hydrogen Chloride Gas", Chem. Abstracts, vol. 78, No. 14 (1972) Columbus.

*Primary Examiner*—Bernard Lipman
*Attorney, Agent, or Firm*—Sanford J. Piltch

[57] ABSTRACT

Rubber particles, to be used as fillers or extenders for various composite polymer systems, are chlorinated by a gas-solid phase reaction with a chlorine-containing gas. A composite polymer containing the chlorinated rubber fillers or extenders exhibits a higher flexural modulus than if prepared using an unchlorinated rubber filler or extender. Chlorination of the rubber particles is carried out by contacting the finely divided rubber particles with a chlorine-containing gas comprising at least about 5 volume percent chlorine. Advantageously, the chlorine can be diluted with air, nitrogen or other essentially inert gases and may contain minor amounts of fluorine. Improved performance is obtained with nitrogen dilution of the chlorine gas over air dilution. Improved polymer composite systems having higher flexural modulus result from the use of the chlorinated rubber particles as fillers instead of unchlorinated rubber particles.

12 Claims, 2 Drawing Sheets

HIGHER MODULUS COMPOSITIONS INCORPORATING PARTICULATE RUBBER

The Government of the United States of America has rights in this invention pursuant to Contract Nos. DE-AC07-88ID12695 and DE-FC02-93CE41037 awarded by the U.S. Department of Energy.

This application is a continuation-in-part of U.S. patent application Ser. No. 08/129,227, filed Sep. 29, 1993, which is a continuation of U.S. patent application Ser. No. 07/842,815, filed Feb. 27, 1992 abandoned.

FIELD OF THE INVENTION

This invention relates to a method for treating vulcanized crumb rubber to be used as a filler or extender in other polymeric resin systems to improve the stiffness, or modulus, of the rubber material to improve the overall modulus of the resulting polymeric resin system incorporating the rubber filler. One source of such crumb rubber is the recycling of used automotive tires.

Various efforts have explored means to improve the recovery or usefulness of rubber reclaimed from automotive tires or other applications. Many of these processes are directed to the devulcanization of the rubber, such as the solvent chlorinolysis process described in a publication on "Chlorinolysis Reclaims Rubber of Waste Tires", J. H. Tervet, G. G. Hull and E. R. DuFresne in NASA Tech Brief Vol. 5, No. 3, Item 55 (January 1981).

In general, use of reclaimed or other crumb rubber is limited by the low stiffness or modulus of the rubber. In the tire industry, reclaimed rubber is the term often used to describe devulcanized rubber, i.e. rubber that has been heated and sheared in the presence of chemicals to break the sulfur bonds. Additional uses can be realized and improved polymer systems benefitting from the inclusion of elastomeric rubber fillers or extenders if the rubber stiffness, or modulus, could be increased. Such high modulus rubber could be used in polyurethane and polyester systems. With fillers of the present invention, rubber reclaimed from used tires may effectively and economically be used as fillers and extenders in substitution for high cost polymers while at the same time effecting the environmentally friendly recycling of the used tires. Other means of producing high modulus rubbers have been described in U.S. Pat. Nos. 4,992,513 and 4,996,262 for producing rubbers having a high modulus by grafting either nylon or polyester onto the rubber. Other methods have used halogenation of the surfaces of rubbers to improve surface adhesion to other polymers. Examples of such treatments are described in U.S. Pat. No. 4,771,110 (use of fluorine) and U.S. Pat. No. 3,553,857 (surface halogenation with bromine or chlorine to improve adhesion).

SUMMARY OF THE INVENTION

This invention provides a relatively easy and inexpensive means for substantially increasing the stiffness, as measured by the Young's modulus, of the bulk of a ground or crumb vulcanized rubber by a gas-solid phase treatment of the rubber with chlorine gas, preferably in a chlorine/air or, even more preferably, in a chlorine/nitrogen mixture. No special pretreatment of the rubber is required. The reaction of the rubber with the chlorine gas mixture can be carried out in any suitable reactor. Since solvents are not used, the expense of solvent handling, recovery and drying are avoided.

This invention is carried out by treating the crumb rubber, which can be in a crumb, pulverized or finely ground (powder) state, with a chlorine-containing gas. The treatment is carried out in a reactor in which the particlized rubber is contacted with the chlorine-containing gas at a temperature from about 32° F. (0° C.) to about 200° F. (93.3° C.), with the reaction pressure being preferably within the range of from about 1 atm to about 10 atm. The chlorine-containing gas will generally comprise from about 5 chlorine by volume to substantially pure chlorine. Preferably the chlorine concentration is in the range of from about 8% to about 50% by volume although such concentrations are not deemed critical. Since the diffusion and reaction rates of the chlorine within the rubber particles is a function of the concentration and pressure of the chlorine, the more encompassing definition of preferable chlorine concentrations for treating the rubber would be the partial pressure of the chlorine. Measured in this manner, the partial pressure of the chlorine should preferably be within the range of from about 0.05 atmospheres absolute (corresponding to a 5% concentration of chlorine in a system at atmospheric pressure) to about 0.5 atm. absolute. The other components, referred to as diluents, of the chlorine-containing gas may comprise air or inert gases such as nitrogen. Preferably the diluent comprises substantially nitrogen. The contact time will depend upon the size of the rubber particles, since the gas must diffuse into the bulk of the particles, and also upon the reaction gas chlorine concentration, temperature and pressure, but is generally in the range of from about 20 seconds to about 60 minutes. Certain reaction conditions, such as higher temperature, pressure or chlorine partial pressure, could result in shorter required exposure times for desired modulus increases. The chlorine-containing gas may be used in either a batch reaction mode with an initial charge of gas containing sufficient chlorine for treatment or may be added continuously throughout the reaction. Contact between the chlorine-containing gas and the rubber particles is best achieved by tumbling the rubber particles within the reactor or by using the chlorine-containing gas to fluidize the rubber particles. In other embodiments, both the chlorine-containing gas and rubber particles may be continuously added to and taken from the reactor. After a suitable reaction time, the treated rubber is separated from the chlorine-containing gas and purged, if necessary, of unreacted chlorine-containing gas by a suitable purge gas, preferably either an air or nitrogen purge.

In addition to the chlorine gas component, it has been found advantageous for the treatment gas to contain a minor amount of fluorine gas. While not necessary to the effective treatment of the rubber using chlorine, the presence of from about 1 to 2 percent by volume of fluorine in the chlorine-containing gas accelerates the treatment process.

The chlorine treated rubber may then be used as a filler or extender in other polymer systems, such as polyurethanes, polyesters, epoxies, nyrim (reaction injection molded nylon), silicone-based polymers, polycarbonates, phenolics, acrylics, polysulfide and other systems requiring a rubber filler of high modulus.

This invention encompasses the chlorine-treated rubber filler materials having a high modulus, the method for making such high-modulus rubber fillers, and composite polymer systems incorporating the high modulus, chlorine-treated rubber fillers and extenders.

DETAILED DESCRIPTION OF THE INVENTION

Figure 1:
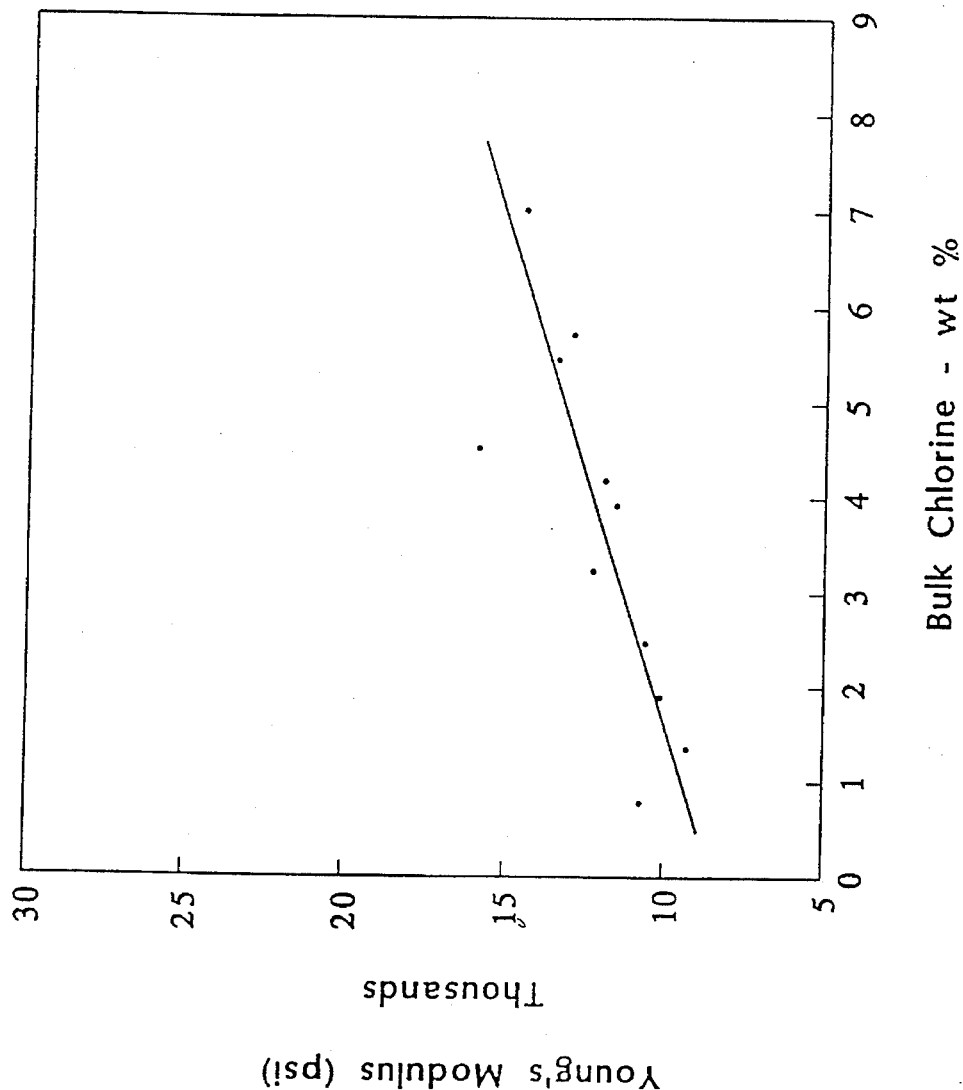
FIG. 1 is a graph of the Young's modulus of the treated rubber as a function of the bulk chlorine content of the treated rubber which has been treated in a chlorine/air mixture.

This invention provides for the modification of rubber materials used as fillers or extenders for other polymer materials to increase the stiffness, measured by the Young's modulus, of the polymer and treated rubber composite material. Young's modulus is defined as a material's resistance to deformation, or stiffness, and is specifically defined as the initial rate of deformation to strain measured by taking the slope of the stress-strain curve in the region of a very small strain. Young's modulus may be measured in accordance with ASTM Method D-638. This increase in the modulus of the composite polymer and treated rubber material makes the treated rubber material suitable for additional use as a filler or extender in composite polymeric materials without excessive decrease in the modulus of the composite polymer which would be normally incident to the use of untreated rubber of the type obtained from automotive tires. In fact, with highly chlorinated rubber particles, the composite may have flexural moduli higher than the host polymer.

Such composite polymers would have substantial uses at considerable cost and energy savings. The treated rubber extender made by chlorinating reclaimed tire rubber particlized material would cost less than about one half to one fourth of the cost of the host polymers. Since it may be substituted in the polymer as an extender or filler at ratios of up to 70% or even higher, depending upon application and polymer system, while maintaining acceptable physical properties, substantial savings will accrue. Possible uses of the chlorinated rubber and polyurethane composite materials are automotive door and window seals, shoe soles, carpet underlay, rollers and solid tires.

The process consists of exposing finely ground rubber particles to chlorine gas, either alone or diluted with another gas. The two most economical gases for such dilution are air and nitrogen, although other relatively inert gases may be used. It will be seen however, that using an inert gas such as nitrogen results in an accelerated chlorination rate and therefore an improved modulus of the ground rubber particles.

The rubber is generally ground to a particle size of from about 40 mesh U.S. standard, to about 200 mesh U.S. standard, preferably in the range of 80 mesh to about 100 mesh. This grinding can be accomplished in any number of conventional grinding and size reduction processes or machines. The particle size to which the rubber is ground will depend upon the intended application of the rubber as a filler or extender. However, the finer the particle size, the more rapid the subsequent chlorination treatment as to improve the bulk modulus of the rubber particles. The treatment process must be allowed sufficient reaction time to enable the chlorine to diffuse and penetrate into the bulk of the rubber particles. Finer particle size provides a higher surface to volume ratio and reduces the required diffusion or penetration distance into the particle interior. The finely divided rubber particles are exposed to the chlorine-containing atmosphere in a suitable reactor in which the rubber powder may be agitated by stirring, tumbling or by fluidization or agitation by the chlorine-containing gas. The treatment may be carried out by any suitable method of contacting the chlorine-containing gas with the powder. The reactor may be charged with a batch of rubber powder and an initial charge of chlorine-containing gas and operated in a batch mode powder, as used in describing the reaction, is intended to convey the understanding that the rubber particles used are ground to a fine mesh size. The mesh or size of the particles may range between 0.25 inches (6,350 microns) to 270 mesh (53 microns). It is presently preferred to utilize particles in the range of 10 mesh (2,000 microns) to 100 mesh (149 microns). Alternatively, the chlorine-containing gas may be continuously circulated through the reactor, with or without addition or replenishment of the contained chlorine gas. When used in a continuous addition or recirculation mode, the chlorine-containing gas may advantageously be used to fluidize the rubber powder. Constant recirculation also permits the most efficient use of the contained chlorine and facilitates environmental control. In addition, it is possible to perform the rubber treatment in a fully continuous mode, where chlorine-containing gas and rubber particles are continuously added to and removed from the reactor. To process the rubber safely, the reactor used should be capable of venting dust explosion pressures of up to ten times the starting pressure. Vessels should be designed in accordance with NFPA 68 for ST-1 class dust explosions.

The chlorine concentration in the chlorine-containing gas is generally in the range of from about 5% by volume up to 100%. Generally, a preferred concentration range for the chlorine is from about 10% to about 50% by volume. Higher concentrations of chlorine in the treating gas generally require shorter treatment times. With chlorine concentrations of from about 10% to about 50%, with particle sizes generally in the range of from about 80 mesh to about 100 mesh, and at treatment temperatures in the range of from about 50° F. (10° C.) to about 90° F. (32° C.), treatment times are generally of the order of 1 to 10 minutes for batch reactors. Continuous treatment times can be of 20 to 60 seconds residence time.

After an adequate treatment time in the presence of the chlorine-containing gas, the treated rubber particles are separated from the chlorine-containing gas. The treated rubber particle mass maybe purged of the chlorine-containing gas, generally with air or nitrogen, if necessary, depending upon the ultimate use of the treated rubber particlized material. During any desired purging, agitation of the powder is continued to assure full removal of the chlorine-containing gas from the powder mass. Once purged of the chlorine-containing gas, the rubber particles may be used as fillers or extenders, in conventional manner, with various polymer systems, but with the result of higher bulk modulus of the resulting composite polymer than if untreated rubber particles were the filler or extender. It has been determined that adequate mixing of the chlorine-containing gas coupled with the uniform addition of the gas to the reaction chamber, and to the particlized rubber material, provide sufficient surface treatment of the particles that any need for the post-reaction purge is substantially eliminated.

EXAMPLES

RUBBER CHLORINATION

Samples of rubber obtained from reclaimed automotive tires were subjected to the chlorine treatment of this invention in a reactor for contacting the rubber with the chlorine-containing gas at atmospheric pressure and ambient temperature. Suitable reactors would include a Rota-Cone™ reactor manufactured by Paul O. Abbe Corp. or a fluidized bed-type reactor. In this example, the reactor consisted of a 316 stainless steel pipe, 6 inches in diameter and 12 inches long. It was fitted with flanges at both ends. Through the top end, a mechanical stirrer entered the reactor. At the bottom end, a sintered, porous stainless steel plate would support the rubber particles while distributing the reactant gas entering from below. The reactor was water jacketed to control the reactor temperature and to remove the exothermic reaction heat.

Chlorine-containing gas was delivered to the reactor throughout the reaction period at rates from 0. 20 to 0. 49 SCF/min. Temperature of the reactions was at approximately 70° F. (21° C.). The pressure of the reactor was maintained at atmospheric pressure. Gas compositions of from 8–40% $Cl_2$ in air or $N_2$ at atmospheric pressure were evaluated. Treatment levels of 0.02–3.63 SCF $Cl_2$/lb of rubber were used. At equal treatment levels (SCF $Cl_2$/lb rubber), shorter exposure times with higher chlorine concentration in gas) leads to higher bulk chlorine in the treated rubber (Run 3 compared to Run 8; Run 6 vs. Run 12; Run 1 vs. Run 2; and Run 4 vs. Run 5) for both diluent gases.

Examples of exposure regimens with the resulting bulk chlorine content in the treated rubber, as measured by elemental combustion analysis, are as follows:

| Run | % Cl in gas | Diluent gas | Total CFM gas | SCF $Cl_2$/ lb rubber | Reaction Time (sec) | Bulk % Cl |
|---|---|---|---|---|---|---|
| 1 | 20.0 | Air | 0.2 | 0.182 | 180 | 2.42 |
| 2 | 40.0 | Air | 0.2 | 0.182 | 90 | 4.08 |
| 3 | 40.0 | Air | 0.2 | 0.364 | 180 | 5.38 |
| 4 | 9.2 | $N_2$ | 0.42 | 0.182 | 180 | 1.47 |
| 5 | 25.0 | $N_2$ | 0.32 | 0.182 | 90 | 1.95 |
| 6 | 25.0 | $N_2$ | 0.32 | 0.364 | 180 | 3.23 |
| 7 | 28.6 | Air | 0.28 | 0.04 | 20 | 1.38 |
| 8 | 28.6 | Air | 0.28 | 0.364 | 180 | 3.87 |
| 9 | 28.6 | Air | 0.28 | 1.09 | 540 | 5.58 |
| 10 | 28.6 | Air | 0.28 | 3.63 | 1800 | 6.96 |
| 11 | 28.6 | $N_2$ | 0.28 | 0.04 | 20 | 1 |
| 12 | 28.6 | $N_2$ | 0.28 | 0.364 | 180 | 4.19 |
| 13 | 28.6 | $N_2$ | 0.28 | 1.09 | 540 | 7.03 |
| 14 | 28.6 | $N_2$ | 0.28 | 3.63 | 1800 | 7.96 |
| 15 | 8.2 | $N_2$ | 0.49 | 0.02 | 20 | 0.62 |
| 16 | 8.2 | $N_2$ | 0.49 | 0.182 | 180 | 1.83 |
| 17 | 8.2 | $N_2$ | 0.49 | 0.545 | 540 | 2.92 |
| 18 | 8.2 | $N_2$ | 0.49 | 1.8165 | 1800 | 4.01 |
| 19 | 9.5 | Air | 0.42 | 0.02 | 20 | 0.74 |
| 20 | 9.5 | Air | 0.42 | 0.182 | 180 | 1.89 |
| 21 | 9.5 | Air | 0.42 | 0.545 | 540 | 3.19 |
| 22 | 9.5 | Air | 0.42 | 1.8165 | 1800 | 4.37 |
| 23 | — | — | — | — | — | <0.3 |

Although it was earlier mentioned that the addition of a small amount of fluorine into the chlorine-containing gas would tend to accelerate the treatment, it has been determined that a chlorine-only treatment of the particlized rubber material is of a greater benefit for the ultimate composite polymer and to the environment. A chlorine-fluorine gas treatment process necessarily requires purging after such treatment to remove noxious by-products from the reactor vessel; the chlorine-only treatment process (as described above) does not require such a purge. Additionally, the by-products created by the chlorine-fluorine treatment process must be neutralized in a scrubber when removing such by-products from the reactor vessel which creates additional economic implications for the overall process. It has been found that the chlorine-only treatment process creates virtually no by-products. Further, the addition of fluorine to the treatment process adds a significant cost to the treatment as fluorine gas costs in the range of $50.00/pound of fluorine.

It has also been determined that certain polymer foam composite materials cannot be directly obtained using particlized rubber material surface treated with a chlorine-fluorine gas due to acidic by-products interfering with the foam chemistry. Particularly, a polyurethane foam composite can best be obtained only from particlized rubber material surface treated with a chlorine-only gas.

Various host polymer systems were composited using chlorinated rubber fillers prepared according to the above examples. Examples of these systems and a comparison of their flexural strength and flexural modulus, and tensile modulus, were made using unchlorinated rubber powder and chlorinated rubber powder as filler in the host polymers. It is to be remembered that the term "powder" is to be understood to be rubber particles ground to a fine mesh size.

URETHANE COMPOSITES

Urethane elastomers containing 15 weight percent of powdered rubber modified according to this invention were prepared using Airthane™ PET 95A urethane resin (Air Products and Chemicals, Inc.) and Ethacure™ 300 (Ethyl Corporation) cross-linker. The urethane elastomers were prepared by combining the identified rubber with preheated resin at 70°–80° C. with thorough mixing. Entrained air was removed by vacuum until no further outgassing occurred. The resin was then placed in an oven until the mixing temperature of about 85° C. was reached. The resin was then combined with sufficient crosslinker to give an index of 1.05 (equivalent to amine/NCO stoichiometry ratio of 0.95). After thorough mixing, the blend was again degassed and then placed in a mold. The sample was cured at 100° C. for 16 hours. The finished specimens were removed from the mold and post-cured for two weeks at room temperature prior to testing. The following results were obtained in accordance with ASTM D-638.

| Run No. | % Cl in gas | Diluent gas | SCF $Cl_2$/lb rubber | Reaction Time (sec) | Bulk % Cl | Young's Modulus |
|---|---|---|---|---|---|---|
| 19 | 9.5 | Air | 0.02 | 20 | 0.74 | 73.8 |
| 7 | 28.6 | Air | 0.04 | 20 | 1.38 | 64.1 |
| 20 | 9.5 | Air | 0.182 | 180 | 1.89 | 69.2 |
| 1 | 20.0 | Air | 0.182 | 180 | 2.42 | 72.4 |
| 21 | 9.5 | Air | 0..545 | 540 | 3.19 | 89.1 |
| 8 | 28.6 | Air | 0.364 | 180 | 3.87 | 79.9 |
| 2 | 40.0 | Air | 0.182 | 90 | 4.08 | 81.4 |
| 22 | 9.5 | Air | 1.8165 | 1800 | 4.37 | 114.0 |
| 3 | 40.0 | Air | 0.364 | 180 | 5.38 | 95.7 |
| 9 | 28.6 | Air | 1.09 | 540 | 5.58 | 92.5 |
| 10 | 28.6 | Air | 3.63 | 1800 | 6.96 | 103.2 |
| 15 | 8.2 | $N_2$ | 0.02 | 20 | 0.62 | 136.8 |
| 11 | 28.6 | $N_2$ | 0.04 | 20 | 1 | 76.1 |
| 4 | 9.2 | $N_2$ | 0.182 | 180 | 1.47 | 68.1 |
| 16 | 8.2 | $N_2$ | 0.182 | 180 | 1.83 | 111.2 |
| 5 | 25.0 | $N_2$ | 0.182 | 90 | 1.95 | 68.1 |
| 17 | 8.2 | $N_2$ | 0.545 | 540 | 2.92 | 124.1 |
| 6 | 25.0 | $N_2$ | 0.364 | 180 | 3.23 | 74.1 |
| 18 | 8.2 | $N_2$ | 1.8165 | 1800 | 4.01 | 150.2 |
| 12 | 28.6 | $N_2$ | 0.364 | 180 | 4.19 | 112.0 |
| 13 | 28.6 | $N_2$ | 1.09 | 540 | 7.03 | 149.8 |
| 14 | 28.6 | $N_2$ | 3.63 | 1800 | 7.96 | 204.4 |
| 23 | — | — | — | — | — | 64.1 |

Figure 2:
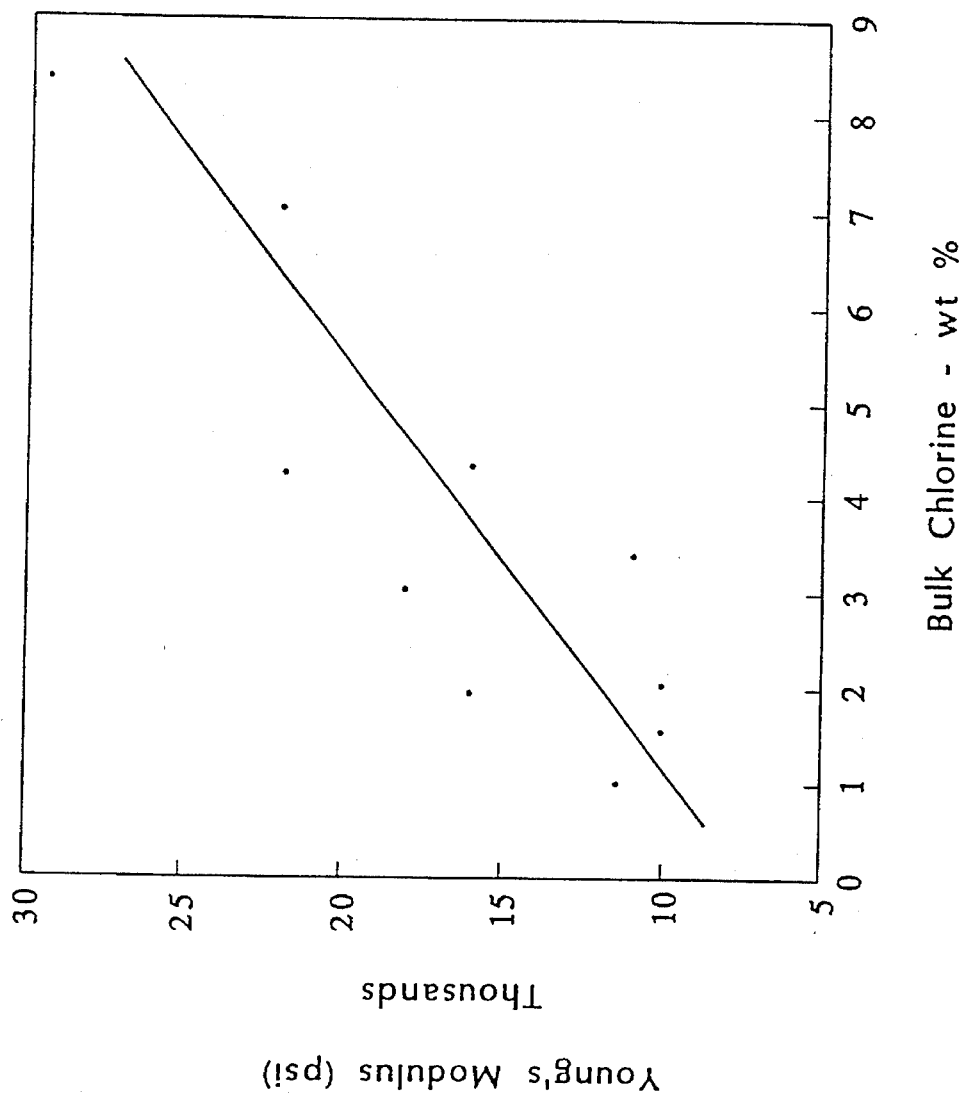
FIG. 2 is a graph of the Young's modulus of the treated rubber as a function of the bulk chlorine content of the treated rubber which has been treated in a chlorine/nitrogen mixture.

FIG. 1 is a graph of the Young's modulus of the polyurethane composite containing the treated rubber as a function of the bulk chlorine content of the treated rubber which has been treated in a chlorine/air mixture. FIG. 2 is a graph of the Young's modulus of the polyurethane composite containing the treated rubber as a function of the bulk chlorine content of the treated rubber which has been treated in a chlorine/nitrogen mixture.

Both $Cl_2/N_2$ and $Cl_2$/air treatments of the rubber are effective in increasing the modulus of the rubber, but the effect of the $Cl_2/N_2$ treatment on composite bulk modulus is more pronounced.

Polyurethane Foam Composites

Polyurethane foams containing 20 weight percent powdered rubber, both modified according to this invention and not treated, were prepared using LG-56 Arcol™ polyol (Arco Chemical Company), Mondur™ TD 80 toluene diisocyante (Miles), 33-LV Dabco™ catalyst (Air Products and Chemicals), L-620 surfactant (OSI Specialties). The materials were prepared by combining the identified rubber with the resin mixture at 20° C. to 30° C. with thorough mixing. The resin mixture was quickly poured into a rectangular mold and foamed. The foam composite was cured at 120° C. for forty minutes. The foam composite was removed from the mold, cut to size and tested in accordance with ASTM D-3574. The comparative results were as follows:

| Rubber Treatment | Foam Density | Tensile Strength | Tear Strength | Ultimate Elongation |
|---|---|---|---|---|
| None | 2.8 g/cm³ | 15.70 N | 9.86 N/m | 143.2% |
| Cl2/Air | 2.7 g/cm³ | 15.88 N | 11.93 N/m | 148.9% |

Epoxy Composites

Epoxy composites containing 20% by weight rubber were prepared using EPON™ 828 Resin (Shell Chemical Company) and PACM-48™ curative (Pacific Anchor Chemical Co.). The epoxy materials were prepared in much the same manner as the polyurethanes above except that the resins were not preheated and the curing time was typically 2 hours at 80°C., followed by 2 hours at 150° C., followed by slow cooling to 25° C. Twenty percent of 200 mesh scrap tire rubber which was treated with a gas blend of 1% $F_2$/20% $Cl_2$/% air mixture was added to the epoxy used and compared to untreated rubber of the same source. The flexural modulus and the tensile strength (ASTM D638) of the composite samples were measured. The comparative results were as follows:

| Rubber Treatment | Tensile Strength | Young's Modulus |
|---|---|---|
| None | 4890 psi | 92,300 psi |
| F2/Cl2/Air | 5284 psi | 94,000 psi |

Polysulfide Sealant

Polysulfide sealant containing 10.6 weight percent powdered rubber, both modified according to this invention and not treated, were prepared with a commonly used resin mixture [major constituents: LP-32 resin (Morton), Cereclor™ 56L chlorinated plasticizer (ICI), calcium carbonate (53.1%)] and a catalyst composition (magnesium oxide (Caras), lead oxide (Eagle Picher), carbon black (Thermax), and Santicizer 278 butyl benzylthalate. The materials were prepared by combining with thorough mixing at ambient temperature and subsequently degassed under vacuum. The composite mastic was pressed into a mold and cured overnight at ambient temperatures. The samples were then post-cured at 120° F. for 48 hours. The cured materials were removed from the mold, cut to size, and tested in accordance with ASTM D-412. The comparative results were as follows:

| Rubber Treatment | Tensile Strength | Tear Strength | Ultimate Elongation | Modulus |
|---|---|---|---|---|
| None | 86.0 psi | 16.6 lbs/in | 63.7% | 354.2 psi |
| C12/Air | 135.1 psi | 20.5 lbs/in | 85.7% | 389.4 psi |

Unsaturated Polyester Composites

Unsaturated polyester composites containing 20% by weight of 80 mesh scrap tire rubber were prepared using COR™ 61aa Resin and methyl ethyl ketone peroxide. The materials were processed in the essentially the same manner as the epoxy samples above except that the resin was allowed to initially cure at room temperature and briefly post-cured at 100° C. for 4 hours. Rubber which was treated with a 2.5% $F_2$/40% $Cl_2$/air mixture was used and compared to untreated rubber of the same source. The flexural modulus and the flexural strength (ASTM D790M) were measured. The comparative results were as follows:

| Rubber Treatment | Flexural Strength | Flexural Modulus |
|---|---|---|
| None | 13.4 MPa | 1489 MPa |
| F2/Cl2/Air | 23.2 MPa | 1882 MPa |

Further tests were also conducted to determine the amount of increased wet traction which could be achieved on particular surfaces. One of the surfaces on which tests were conducted was concrete, the other surface being steel.

To accomplish the desired testing on the selected surfaces, treated rubber particles were added to the composition of specialty vehicle tires, shoe sole composites, pulley wheels and rollers used for material transport. The specialty vehicle tires in which the treated rubber composition has been tested are non-inflatable tires used, for example, on lift vehicles and the like. The pulley wheels may be utilized in transportation systems such as escalators. The material transport systems in which the rollers have been tested are material transport systems for moving large, heavy materials such as sheet steel. Further, material transport systems may have rollers which function in juxtaposed positioning to form a gripper roller system which may be utilized in paper product manufacturing, e.g. forming envelopes, etc. In all instances, it has been the goal to increase the frictional contact between the treated rubber element and the surface which it contacts. Tests were performed on two exemplary surfaces, concrete and steel, as set forth in the following two examples:

Wet Coefficient of Friction

Andur 2-60 DP Polyurethane (Anderson Dev. Co.), containing the weight percent particlized rubber material, modified according to this invention, was cured with Curene™ 422 (Anderson Dev. Co.) 4,4'-methylene bis(ortho-chloroaniline) [MBOCA] at 100° C. in a mold at ambient pressure. The cured materials were removed from the mold, cut to size, lightly sanded to expose the rubber and tested in accordance with ASTM D 1894-90 (modified). The comparative results were as follows:

| Weight % Treated | Coefficient of Friction on Concrete | |
|---|---|---|
| Particlized Rubber | Static | Dynamic |
| 0 | 0.98 | 0.72 |
| 10 | 1.00 | 0.82 |
| 20 | 1.06 | 0.87 |

The test results show a clear increase in the coefficient of friction on both surfaces with the treated rubber particles, which results in significantly better traction and gripping.

Adiprene™ LF-95 polyurethane (Uniroyal Chemical Co.) was cured with Ethacure™ 300 (Ethyl Corporation) at 100° C. and pressed into a mold, allowing the curing to occur at ambient pressure. The cured materials were removed from the mold, cut to size, and tested in accordance with ASTM D-1894-90 (modified). The comparative results were as follows:

| Weight % Treated | Coefficient of Friction on Steel | |
|---|---|---|
| Particlized Rubber | Static | Dynamic |
| 0 | 0.57 | 0.55 |
| 10 | 0.58 | 0.69 |

For ease of understanding in defining the various groups of host polymer systems, the following definitions and groupings will be used in describing the polymer grouping with which the treated particlized rubber material is combined. Condensation polymerization can be defined as a polymerization reaction in which water, or some other simple molecule, is eliminated from two or more monomer molecules as they combine to form the polymer or cross links between polymer chains. Examples of resins so made are alkyls, phenol-formaldehyde, urea-formaldehyde, polyesters, polyamides, acetals, polyphenylene oxide and other phenolics. These materials will be referred to as Condensation Polymers.

Another polymer grouping is Addition Polymers. Addition polymerization is defined as a reaction in which unsaturated monomer molecules join together to form a polymer in which the molecular formula of the repeating unit is identical (except for the double bond) with that of the monomer. The molecular weight of the polymer so formed is thus the total of the molecular weights of all of the combined monomer units.

Example: $n\ CH_2=CH_2 \rightarrow (—CH_2CH_2)_n$, with molecular weight=nx 28.03

Examples of Addition Polymers are polyethylene, polypropylene and polybutadiene.

Another category of polymers are Copolymers, Terpolymers, Blends and Alloys which include ethylene-propylene-diene (EPDM), acrylonitrile-butadiene-styrene and styrene-acrylonitrile (SAM). Another grouping which can be referred to as Heteroatom Containing Polymers, has an oxygen or halogen atom as a part of the basic polymer formation. Such Heteroatom Containing Polymers due to the inclusion of an oxygen or halogen atom, significantly increase the polarity of the resulting polymer and make such polymers more suitable to the introduction of the treated particlized rubber material of this invention. Examples of Heteroatom Containing Polymers are polyvinyl chloride, polyurea, and acetal.

Another category or grouping of polymers are Latex Polymers. Latex is defined as (1) a stable emulsion of a polymer in water, mostly used in paints and coatings; and (2) the sap of the hevea (rubber) tree and other plants or emulsions prepared from the same. Latices of interest to the plastics industry are based mainly on the styrene-butadiene copolymers, polystyrene, acrylics, vinyl polymers, and other copolymers. Further examples of Latex Polymers are acrylates and styrenics.

Concrete is a composite material made of cement, aggregates, admixtures and water. Although the aggregates make up ¾ of the volume of concrete, the active constituent in concrete is cement paste and the properties and performance of concrete are largely determined by the properties of the cement paste.

According to ASTM C-150, portland cement is a hydraulic cement produced by pulverizing clinker consisting essentially of hydraulic calcium silicates, usually containing one or more of the forms of calcium sulfate as an interground addition. The major phases of portland cement are tricalcium silicate ($3CaO.SiO_2$), dicalcium silicate ($2CaO.SiO_2$), tricalcium aluminate ($3CaO.Al_2O_3$) and a ferrite phase of average composition ($4CaO.Al_2O_3.Fe_{b2}O_3$).

The C—S—H phase (calcium-silicone-hydration) is the main binding agent in portland cement pastes. The exact structure of C—S—H is not easily determined considering the several possibilities by which the atoms and ions are bonded to each other in this phase. It is believed that the siloxane groups, water molecules, and calcium ions may contribute to bonds across surfaces or in the interlayer position of poorly crystalized C—S—H material such that the bonding substantially resembles an inorganic polymer bonding structure. Thus, concrete may be considered to be an inorganic polymer and singularly constitute a group which will be referred to as Inorganic Polymers.

Yet another category or grouping of polymers are Naturally Occurring Polymers. Naturally occurring polymers or polymer-like materials are asphalt and Gilsonite. Asphalt can be defined as a dark brown or black, bituminous, viscous material found in natural deposits and also produced as a residue of petroleum refining. Asphalt, whether found in natural beds or obtained as a residue of petroleum refining, consists chiefly of hydrocarbons which may be any of a various mixture of such hydrocarbons, e.g. tar, which occur often in combination with their non-metallic derivatives.

Gilsonite is a naturally occurring, solid carbonacious material which is classified as an asphaltite. It is a relatively pure hydrocarbon without significant amounts of mineral impurities. Both asphalt and Gilsonite are considered to be short-chain hydrocarbon based polymers which can be obtained from naturally occurring deposits or, in the case of asphalt, from heat refining of petroleum. The definitions used herein have been excerpted from *Whittington's Dictionary of Plastics*, edited by James F. Carley and published by Technomic Publishing Company.

The present invention may be embodied in other specific forms without departing from the spirit or essential attributes thereof and, accordingly, the described embodiments are to be considered in all respects as being illustrative and not restrictive, with the scope of the invention being indicated by the appended claims, rather than the foregoing detailed description, as indicating the scope of the invention as well as all modifications which may fall within a range of equivalency which are also intended to be embraced therein.

We claim:

1. Particlized rubber material treated to increase its tensile and flexural modulus by contacting said particlized rubber material in a gas/solid phase reactor with a chlorine-containing gas at a temperature and chlorine gas partial pressure sufficient to increase the bulk chlorine content of the particlized rubber material to between about 0.25% and 10%.

2. The particlized rubber material of claim 1 wherein the chlorine-containing gas which contacts said particlized rubber material comprises chlorine having a partial gas pressure of at least 0.05 atmospheres with the remainder of said chlorine-containing gas comprising a diluent from the group consisting essentially of air, oxygen, nitrogen or other inert gases.

3. The particlized rubber material of claim 1 wherein the chlorine-containing gas which contacts said particlized rubber material comprises chlorine having a partial gas pressure of at least 0.05 atmospheres together with fluorine having a partial gas pressure of between about 0.005 and 0.025 atmospheres with the remainder of said chlorine-containing gas comprising a diluent from the group consisting essentially of air, oxygen, nitrogen or other inert gases.

4. The particlized rubber material of claim 1 wherein the chlorine-containing gas which contacts said particlized rubber material comprises chlorine having a partial gas pressure of between about 0.1 atmospheres to about 0.5 atmospheres such that the reaction of chlorinating said particlized rubber material in the chlorine-containing gas is carried out at from about 0.5 atmospheres to about 25 atmospheres total pressure with the treated particlized rubber material having a bulk chlorine content of from about 1 weight percent chlorine to about 10 weight percent chlorine.

5. The particlized rubber material of claim 1 wherein said material is comprised of granulated recovered tire rubber.

6. The particlized rubber material of claim 4, wherein said material is comprised of granulated recovered tire rubber.

7. The particlized rubber material of claim 1, wherein said material is comprised of granulated post-industrial/post-consumer recovered rubber.

8. The particlized rubber material of claim 4, wherein said material is comprised of granulated post-industrial/post-consumer recovered rubber.

9. Granulated reclaimed tire rubber treated by contacting the granulated rubber in a gas/solid phase reactor with a chlorine-containing gas a temperature and chlorine gas partial pressure sufficient to increase the bulk chlorine content of the granulated rubber to between a bulk chlorine content of from 1 to 10 weight percent.

10. A composite polymer comprising a matrix polymer containing as a filler the treated granulated rubber of claim 9, wherein the matrix polymer is selected from the group consisting of polyurethanes, epoxies, polyesters, acrylics, silicone polymers, polysulfides, polyamides and polycarbonates.

11. The composite polymer of claim 10, wherein the matrix polymer is selected from the group consisting of condensation polymers, addition polymers, copolymers/terpolymers/blends/alloys, heteroatom containing polymers, latex polymers, inorganic polymers and naturally occurring polymers.

12. Granulated reclaimed tire rubber having a bulk chlorine content of from 1 to 10 weight percent.

* * * * *